(12) United States Patent (10) Patent No.: US 7,852,822 B2
Wang et al. (45) Date of Patent: Dec. 14, 2010

(54) WIDE AREA AND LOCAL NETWORK ID TRANSMISSION FOR COMMUNICATION SYSTEMS

(75) Inventors: Michael Mao Wang, San Diego, CA (US); Bojan Vrcelj, San Diego, CA (US); Krishna Kiran Mukkavilli, San Diego, CA (US); Raghuraman Krishnamoorthi, San Diego, CA (US); Rajiv Vijayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1105 days.

(21) Appl. No.: 11/021,310

(22) Filed: Dec. 22, 2004

(65) Prior Publication Data

US 2006/0133388 A1 Jun. 22, 2006

(51) Int. Cl.
*H04J 1/00* (2006.01)
(52) U.S. Cl. .................................. 370/343; 370/430
(58) Field of Classification Search ................. 370/318, 370/336, 319, 332, 334, 344, 373, 389, 395.4, 370/343, 430
See application file for complete search history.

(56) References Cited

U.S. PATENT DOCUMENTS

| | | | | |
|---|---|---|---|---|
| 5,659,685 | A * | 8/1997 | Williams et al. | 709/220 |
| 6,405,253 | B1 * | 6/2002 | Schutte et al. | 709/228 |
| 6,519,224 | B2 * | 2/2003 | Hrastar et al. | 370/227 |
| 6,810,269 | B1 * | 10/2004 | Aramaki | 455/560 |
| 6,922,412 | B2 * | 7/2005 | Hrastar et al. | 370/401 |
| 6,952,454 | B1 | 10/2005 | Jalali et al. | |
| 2001/0012292 | A1 * | 8/2001 | Merrill et al. | 370/389 |
| 2001/0012297 | A1 * | 8/2001 | Hrastar et al. | 370/401 |
| 2001/0019557 | A1 * | 9/2001 | Hrastar et al. | 370/401 |
| 2001/0043562 | A1 * | 11/2001 | Hrastar et al. | 370/227 |

(Continued)

FOREIGN PATENT DOCUMENTS

EP 1079645 A1 * 2/2001

(Continued)

OTHER PUBLICATIONS

Wireless Internet Post Office: Providing Rural Access to Text based Digital Communication using Wireless Multi-hop Mesh Networking Sponsored by PAN ASIA ICT R&D Grants Programme Aug. 29, 2003.*

(Continued)

*Primary Examiner*—Salman Ahmed
(74) *Attorney, Agent, or Firm*—Sandip (Micky) S. Minhas; Gerald P. Joyce, III

(57) ABSTRACT

The embodiments utilize OFDM symbols to communicate network IDs. The IDs are encoded into symbols utilizing the network IDs as seeds to scramble respective pilots that are then transmitted by utilizing the symbols. The pilots can be structured into a single OFDM symbol and/or multiple OFDM symbols. The single symbol structure for transmitting the network IDs is independent of the number of network ID bits and minimizes frequency offset and Doppler effects. The multiple symbol structure allows a much coarser timing accuracy to be employed at the expense of transmitting additional symbols. Several embodiments employ a search function to find possible network ID candidates from a transmitted symbol and a selection function to find an optimum candidate from a network ID candidate list.

47 Claims, 14 Drawing Sheets

U.S. PATENT DOCUMENTS

| | | |
|---|---|---|
| 2003/0072395 A1 | 4/2003 | Jia et al. |
| 2003/0125040 A1* | 7/2003 | Walton et al. ............... 455/454 |
| 2004/0081131 A1* | 4/2004 | Walton et al. ............... 370/344 |
| 2004/0082356 A1* | 4/2004 | Walton et al. ............... 455/522 |
| 2004/0161046 A1* | 8/2004 | Schott et al. ............... 375/260 |
| 2005/0095987 A1* | 5/2005 | Lyons et al. ............. 455/67.13 |
| 2005/0102384 A1* | 5/2005 | Ueno et al. .................. 709/223 |
| 2005/0120097 A1* | 6/2005 | Walton et al. ............... 709/220 |
| 2005/0122928 A1* | 6/2005 | Vijayan et al. ............. 370/312 |
| 2005/0147176 A1* | 7/2005 | Yun et al. .................... 375/260 |
| 2005/0152314 A1* | 7/2005 | Sun et al. .................... 370/334 |
| 2005/0185733 A1* | 8/2005 | Tolli et al. ................... 375/285 |
| 2005/0195733 A1* | 9/2005 | Walton et al. ............... 370/208 |
| 2005/0244000 A1* | 11/2005 | Coleman ..................... 380/44 |
| 2005/0265220 A1* | 12/2005 | Erlich et al. ................. 370/208 |
| 2005/0286465 A1* | 12/2005 | Zhuang ....................... 370/329 |
| 2006/0045001 A1* | 3/2006 | Jalali .......................... 370/208 |
| 2006/0050625 A1* | 3/2006 | Krasner ...................... 370/208 |
| 2006/0062196 A1* | 3/2006 | Cai et al. .................... 370/345 |
| 2006/0146962 A1* | 7/2006 | Troya et al. ................. 375/340 |
| 2006/0182077 A1* | 8/2006 | Scherzer et al. ............. 370/338 |
| 2007/0081484 A1* | 4/2007 | Wang ......................... 370/315 |
| 2007/0121529 A1* | 5/2007 | Meier ......................... 370/256 |
| 2007/0177560 A1* | 8/2007 | Swartz et al. ............... 370/338 |
| 2007/0223406 A1* | 9/2007 | Li et al. ...................... 370/278 |
| 2008/0039107 A1* | 2/2008 | Ma et al. ..................... 455/450 |
| 2008/0095039 A1* | 4/2008 | Joo et al. .................... 370/210 |
| 2008/0291856 A1* | 11/2008 | Li et al. ...................... 370/311 |

FOREIGN PATENT DOCUMENTS

| | | |
|---|---|---|
| EP | 1337069 A | 8/2003 |
| JP | 15244763 | 8/2003 |
| KR | 200321258 | 3/2003 |
| KR | 200445996 | 6/2004 |
| WO | WO 2004049618 | 6/2004 |

OTHER PUBLICATIONS

"Broadband Radio Access Networks (BRAN); HIPERLAN Type 2, Physical layer, ETSI TS 101 475" ETSI Standards, European Telecommunications Standards Institute, Sophia-Antipo, FR, vol. BR, No. V131, Dec. 2001, pp. 19-20, 22-25, and pp. 29-30, table 9.

"Broadband Radio Access Networks (BRAN); HIPERLAN Type 2; data Link Control (DLC) Layer; Part 1: Basic Data Transport Functions; ETSI TW 101 761-1" ETSI Standards, European Telecommunications Standards Institute, Sophia-Antipo, FR, vol. BR, No. V131, Dec. 2001, pp. 22-25; 29-30; table 9.

International Search Report—PCT/US/05/046805—International Search Authority—European Patent Office—May 8, 2006.

Written Opinion—PCT/US/05/046805—International Search Authority—European Patent Office—May 8, 2006.

\* cited by examiner

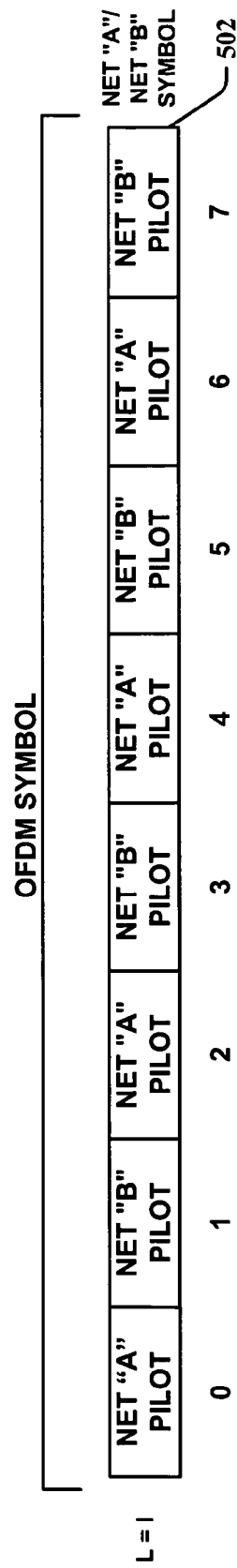
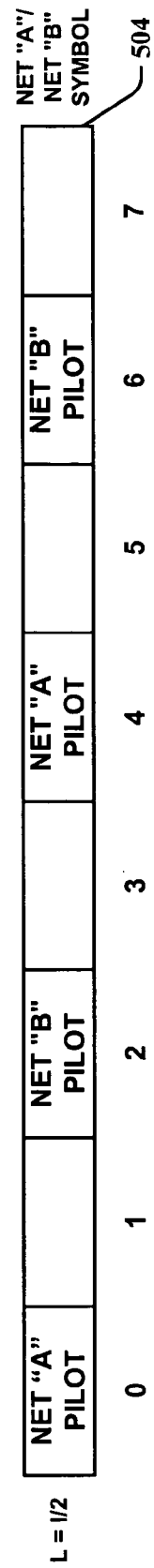
FIG. 5A
FIG. 5B

WIDE AREA AND LOCAL NETWORK ID TRANSMISSION FOR COMMUNICATION SYSTEMS

BACKGROUND

I. Field

The embodiments relate generally to data communications, and more particularly to systems and methods for structuring network IDs into OFDM symbols utilized in a wireless communication system.

II. Background

The introduction of wireless technology for personal communications has almost made the traditional telephone a thing of the past. As wireless technologies improve, the sheer numbers of parties desiring to communicate wirelessly keep increasing substantially. "Cell" phones have developed into multifunctional devices that not only function to relay voice communications, but data as well. Some devices have also incorporated interfaces to the Internet to allow users to browse the World Wide Web and even download/upload files. Thus, the devices have been transformed from a simple voice device to a "multimedia" device that enables users to receive/transmit not only sound, but also images/video as well. All of these additional types of media have tremendously increased the demand for communication networks that support these media services. The freedom to be 'connected' wherever a person or device happens to be located is extremely attractive and will continue to drive future increases in wireless network demand.

Thus, the 'airwaves' in which wireless signals are sent become increasingly crowded. Complex signals are employed to utilize signal frequencies to their fullest extent. However, due to the sheer numbers of communicating entities, it is often not enough to prevent interference of signals. Network identification (ID) is typically transmitted with data so that a receiving entity knows the origination of the data. When interferences occur, a receiving entity may not be able to properly interpret what network the signal originated from and may lose information. This drastically reduces the efficiency of a communication network, requiring multiple sends of the information before it can be properly received. In the worst case, the data may be totally lost if it cannot be resent. If a network has hundreds or even thousands of users, the probability of not being able to identify a network ID increases substantially. The demand for wireless communications is not decreasing. Therefore, it is reasonable to assume that signal interferences will continue to increase, degrading the usefulness of existing technology. A communication system that can avoid this type of data corruption will be able to provide increased reliability and efficiency to its users.

SUMMARY

The following presents a simplified summary in order to provide a basic understanding of some aspects of the embodiments. This summary is not an extensive overview of the embodiments. It is not intended to identify key/critical elements of the embodiments or to delineate the scope of the embodiments. Its sole purpose is to present some concepts of the embodiments in a simplified form as a prelude to the more detailed description that is presented later.

The embodiments relate generally to data communications, and more particularly to systems and methods for structuring network IDs into OFDM symbols utilized in a wireless communication system. Multiple network IDs are encoded into symbols utilizing the network IDs as seeds to scramble respective pilots that are then transmitted utilizing the symbols. The pilots can be structured into a single OFDM symbol and/or multiple OFDM symbols. The single symbol structure for transmitting the network IDs is independent of the number of network ID bits and minimizes frequency offset and Doppler effects, providing a high spreading gain of network ID data that is highly resistant to interference from other network ID broadcasts. The multiple symbol structure, however, allows a much coarser timing accuracy to be employed at the expense of transmitting additional symbols. One embodiment is a method for facilitating data communications that utilizes at least one OFDM symbol structured with at least one pilot respective of a network ID for communicating the network ID between entities. Another embodiment is a system that facilitates data communications that includes a communication component that communicates at least one network ID between entities by utilizing at least one OFDM symbol that includes at least one pilot respective of the network ID.

Several embodiments employ a search function to find possible network ID candidates from a transmitted symbol and a selection function to find an optimum candidate from the network ID candidate list. When multiple network IDs are structured into received symbols, typically, a first network ID is determined and utilized to facilitate in determining a second network ID. By employing metrics, a score or value can be assigned to each possible ID and an optimum set of network IDs can be determined by maximizing the score of the set of IDs. Thus, the embodiments provide a robust, cost-effective means to substantially reduce network ID interferences and increase network ID data reception.

To the accomplishment of the foregoing and related ends, certain illustrative embodiments are described herein in connection with the following description and the annexed drawings. These embodiments are indicative, however, of but a few of the various ways in which its principles may be employed and is intended to include all such embodiments and their equivalents.

BRIEF DESCRIPTION OF THE DRAWINGS

FIG. 5 is an illustration of single OFDM symbol structures in accordance with an embodiment.

DETAILED DESCRIPTION

Figure 1:
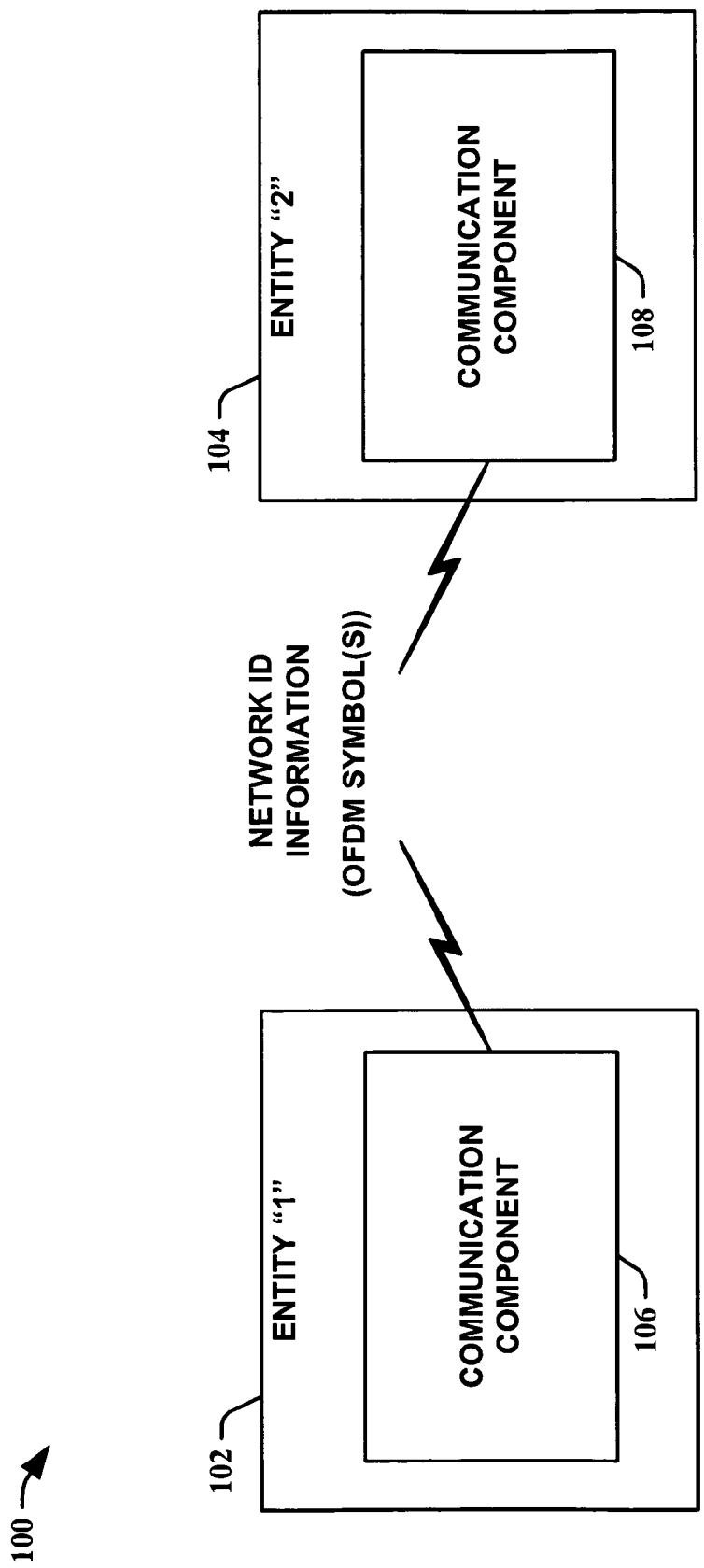
FIG. 1 is a block diagram of a data communication system in accordance with an embodiment.

The embodiments are now described with reference to the drawings, wherein like reference numerals are used to refer to like elements throughout. In the following description, for purposes of explanation, numerous specific details are set forth in order to provide a thorough understanding of the embodiments. It may be evident, however, that the embodiments may be practiced without these specific details. In other instances, well-known structures and devices are shown in block diagram form in order to facilitate describing the embodiments. As used in this application, the term "component" is intended to refer to an entity, either hardware, software, a combination of hardware and software, or software in execution. For example, a component may be, but is not limited to being, a processor, a process running on a processor, and/or a multiplexer and/or other signal facilitating devices and software.

In accordance with the embodiments and corresponding disclosure thereof, various aspects are described in connection with a subscriber station. A subscriber station can also be called a system, a subscriber unit, mobile station, mobile, remote station, access point, base station, remote terminal, access terminal, user terminal, user agent, or user equipment. A subscriber station may be a wireless telephone, a cordless telephone, a Session Initiation Protocol (SIP) phone, a wireless local loop (WLL) station, a personal digital assistant (PDA), a handheld device having wireless connection capability, or other processing device connected to a wireless modem.

The embodiments provide systems and methods to facilitate communication of network IDs in wireless systems. Utilization of OFDM symbols provides a means to transmit and receive pilots that have been scrambled based upon a respective network ID. By decoding the scrambled pilots, the network IDs can be retrieved. In this manner, dedicated symbols can provide a robust mechanism for relaying network IDs, substantially reducing interference from other networks. Additionally, the embodiments allow for multiple network IDs to be communicated in a single symbol or in multiple symbols. A single symbol structure requires more fine timing accuracy, while the multiple symbol structure requires coarse timing accuracy, but at the cost of additional symbols. A typical embodiment of a multiple structure utilizes separate symbols for each network ID to be communicated.

Reception and decoding of the network IDs is generally obtained utilizing a two stage process that includes a search process (that can be implemented by a search component) for finding a list of possible network ID candidates and a selection process (that can be implemented by a selection component) for selecting an optimum candidate from the candidate network ID list. The embodiments provide multiple means for determining the network IDs dependent upon the method utilized to encode the network ID into the symbol(s). Thus, a single symbol that contains a two network ID structure of interleaved pilots utilizes a different method of decoding than a dual symbol structure that contains a separate symbol for each network. The selection process itself can be eliminated by only maintaining a top scored value that is determined by a search metric. This essentially reduces a possible network ID candidate list to only a single choice, negating the necessity of having a follow-on selection process.

Typically, mobile wireless units are not aware of what networks are available in a particular area. In order for these units to operate, they must acquire network IDs by intercepting them from wireless signals. Normally, there are wide area networks and local area networks in a reception area that each has its own IDs. These IDs act as keys to facilitate in decoding program material. In a high traffic area, however, it may be difficult for a mobile device to properly interpret network IDs due to interference by other networks in the area.

In FIG. 1, a block diagram of a data communication system 100 in accordance with an embodiment is shown. The data communication system 100 is comprised of an entity "1" 102 and an entity "2" 104. Entity "1" 102 and entity "2" 104 each have a communication component 106 and 108 respectively. The embodiment is not limited to only two communicating entities and is shown as such for illustrative purposes only. Entity "1" 102 utilizes the communication component 106 to encode its network ID into an OFDM symbol and transmit it wirelessly. Entity "2" 104 acquires the transmitted signal from entity "1" 102 and utilizes its communication component 108 to decode the network ID transmitted by entity "1" 102. Once decoded, the network ID can then be utilized to facilitate in interpreting programming from entity "1" 102. The transmitted network ID can be a single OFDM symbol and/or multiple OFDM symbols. By utilizing the embodiment, the robustness of the acquisition of the network ID is increased substantially, especially when in a high interference area. The embodiment also provides a mechanism to transmit multiple network IDs in a single OFDM symbol and/or multiple OFDM symbols. This is accomplished by interleaving pilots representative of the network IDs in one OFDM symbol and/or utilizing one OFDM symbol per pilot. Additionally, one skilled in the art can appreciate that a communication component of the embodiments is not required to reside within a transmitting and/or receiving entity. It can provide the OFDM symbol structures and/or symbol structure interpretation for the transmitting and/or receiving component respectively from an external, remote location.

In some communication systems, for example, two layers of network IDs exist such as, for example, network ID type A and network ID type B. Typically, a wireless system needs to acquire network ID type A to decode type A program material and needs to acquire both network ID type A and network ID type B to decode type B programs. Thus, a system that desires, for example, to decode local programming needs to acquire both a wide area programming network ID and a local programming network ID to decode the local programming, while only the wide area programming network ID is necessary to decode the wide area programming.

Figure 2:
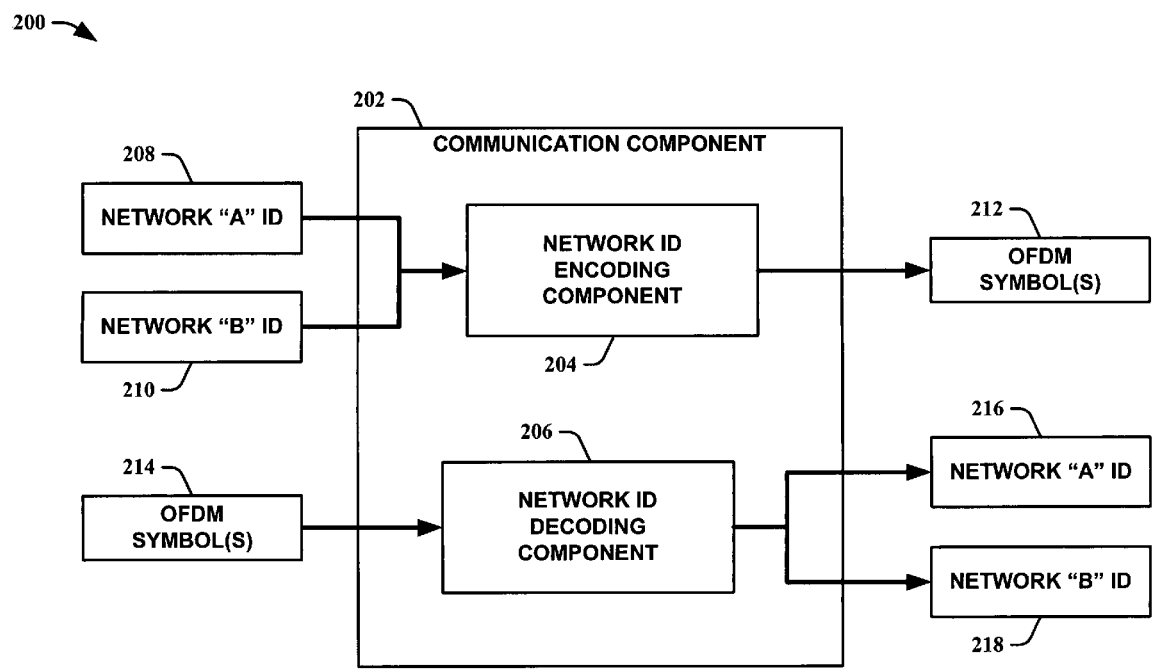
FIG. 2 is another block diagram of a data communication system in accordance with an embodiment.

Turning to FIG. 2, another block diagram of a data communication system 200 in accordance with an embodiment is illustrated. The communication system 200 is comprised of a communication component 202. The communication component 202 is comprised of a network ID encoding component 204 and a network ID decoding component 206. The network ID encoding component 204 receives network "A" ID 208 and network "B" ID 210 and encodes the IDs 208, 210 into OFDM symbol(s) 212. The encoding utilizes pilots that are scrambled based on network IDs and inserted into OFDM symbol(s). This aspect is described in greater detail herein. Once the OFDM symbol(s) have been constructed they are typically transmitted for reception by various entities such as, for example, mobile wireless devices. The network ID decoding component 206 receives OFDM symbol(s) 214 and decodes the symbol(s) into network "A" ID 216 and network "B" ID 218. Once the network IDs are known, a mobile device can utilize them to facilitate in utilizing programming from the respective networks. One skilled in the art will appreciate that the embodiments can utilize a communication component 202 that has only either a network ID encoding component 204 or a network ID decoding component 206, but not both. Thus, a wireless device that is utilized to receive information may not have an encoding component 204. Likewise, a network transmitting device may not have a decoding component 206.

Figure 3:
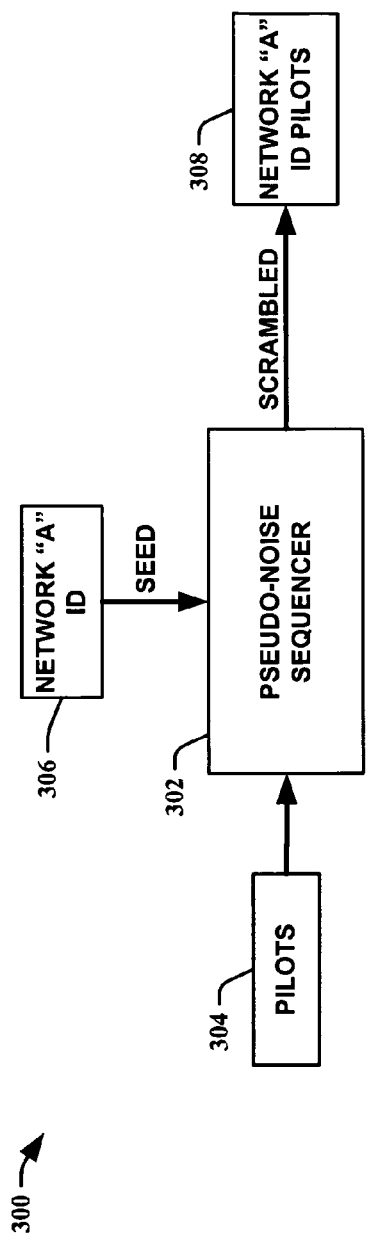
FIG. 3 is an illustration of scrambling pilots for a single network ID in accordance with an embodiment.
Figure 4:
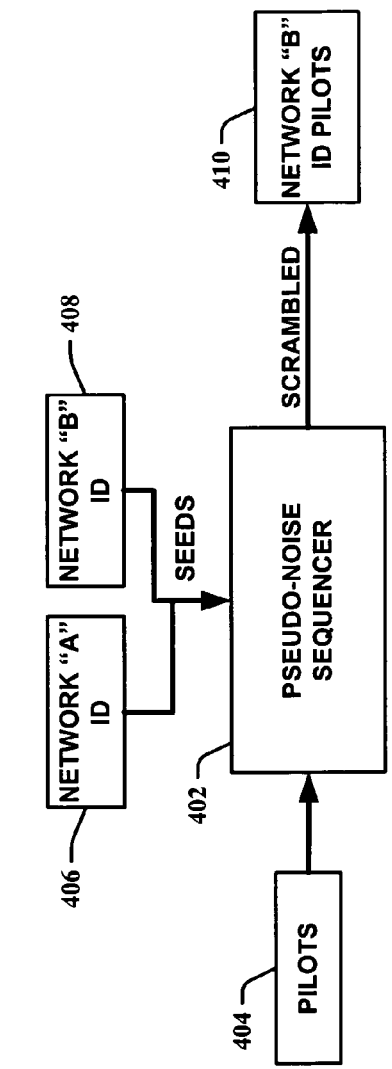
FIG. 4 is an illustration of scrambling pilots for multiple network IDs in accordance with an embodiment.

Looking at FIG. 3, an illustration 300 of scrambling pilots for a single network ID in accordance with an embodiment is shown. In one embodiment, a pseudo-noise sequencer 302 is utilized to facilitate in encoding a network ID into an OFDM symbol. The pseudo-nose sequencer 302 receives pilots 304 and employs a network "A" ID as a seed to scramble the pilots 304. This creates network "A" ID pilots 308 that contain network ID information for network "A." In FIG. 4, an illustration 400 of scrambling pilots for multiple network IDs in accordance with an embodiment is depicted. In this embodiment, a pseudo-noise sequencer 402 receives pilots 404 and employs both network "A" ID 406 and network "B" ID 408 as seeds to scramble the pilots 404. This produces network "B" ID pilots 410 that contain network ID information for both network "A" and network "B." Thus, network "A" ID is typically required to be known before the network "B" ID can be decoded. For this reason, a decoding process typically decodes the network "A" ID first before decoding the network "B" ID.

The embodiments utilize dedicated OFDM symbols for network IDs. A preferred embodiment is illustrated in FIGS. 5-6. In this preferred embodiment, the sub-carrier groups are structured as interlaces. That is, the sub-carriers of an OFDM symbol is sub-divided into I interlaces indexed from 0 to I−1. Each interlace consists of P sub-carriers where the sub-carriers are spaced I×Δf apart in frequency, with Δf being the sub-carrier spacing.

In FIG. 5, an illustration of single OFDM symbol structures 500 in accordance with an embodiment is shown. In FIG. 5A, one OFDM symbol 502 is utilized to transmit both network "A" and network "B" ID information through respective network ID pilots that are interlaced in the symbol. In this embodiment, L (I/L=2, 4, . . . , I/2) evenly spaced interlaces are filled with pilots of which L/2 evenly spaced interlaces are utilized for Network "A" and another L/2 evenly spaced interlaces are utilized for Network "B," and the unused interlaces are nulled (no energy). In this example, I=8, P=512, and the total number of sub-carriers is, therefore, 4096. In one embodiment (FIG. 5A), L=I=8, four even interlaces (0, 2, 4, 6) are utilized for network "A" which are filled with network "A" ID pilots (pilots scrambled by pseudo-noise sequences seeded with network "A" ID). Four odd interlaces (1, 3, 5, 7) are utilized by network "B" and are occupied by network "B" ID pilots (pilots scrambled by network "B" sequences (sequences seeded by both network "A" ID and network "B" ID)). In another embodiment (FIG. 5B), L=I/2, interlaces (0, 4) are utilized for network "A" and interlaces (2, 6) are utilized by network "B" in one OFDM symbol 504.

Figure 6A:
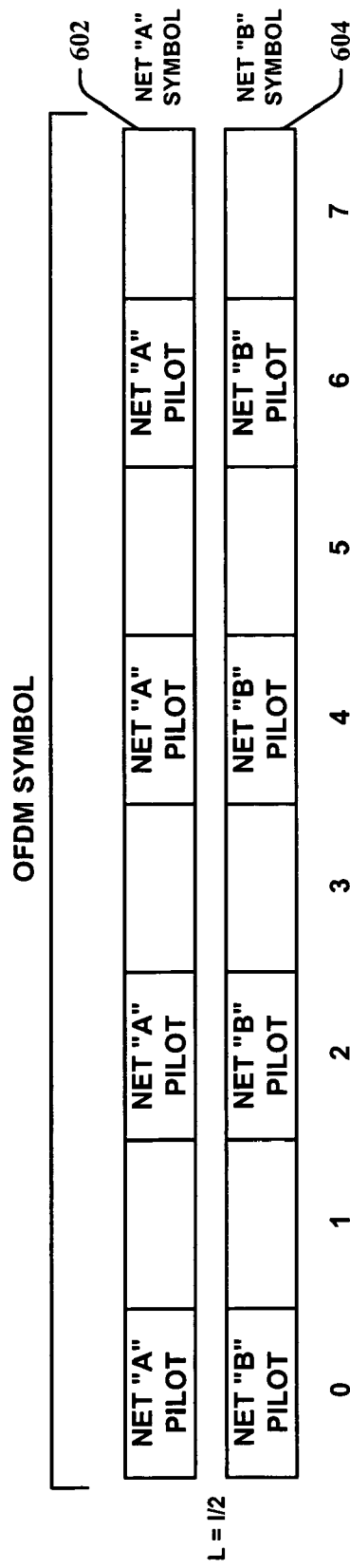
FIG. 6 is an illustration of dual OFDM symbol structures in accordance with an embodiment.
Figure 6B:
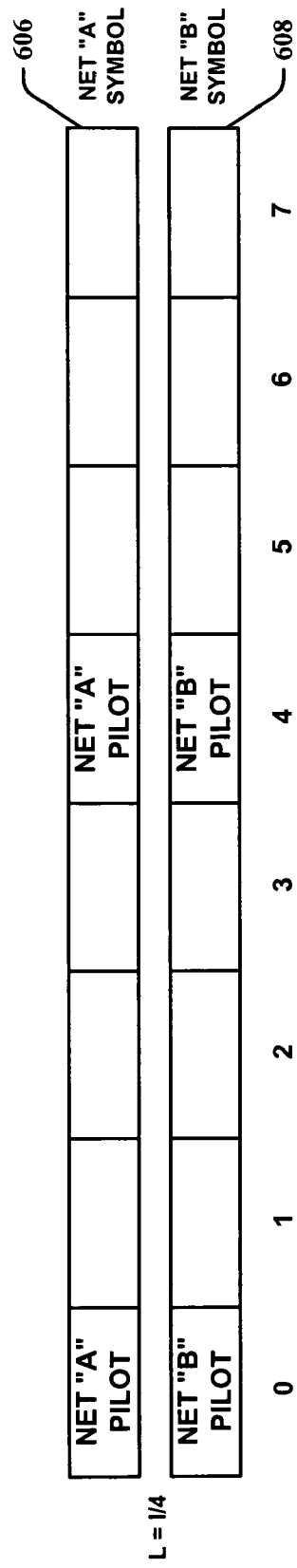

Turning to FIG. 6, an illustration of dual OFDM symbol structures 600 in accordance with an embodiment is shown. In FIG. 6A, network "A" ID pilots are inserted in a single OFDM symbol 602 and network "B" pilots are inserted into a single OFDM symbol 604. For this dual symbol structure, the utilized interlaces, L (I/L=1, 2, . . . , I), are evenly spaced network "A" ID and network "B" ID pilot interlaces inserted in the network "A" 602 and network "B" 604 symbols, respectively, each of which generates I/L periods in the time domain. In FIG. 6B, another embodiment of a dual structure is illustrated where network "A" symbol 606 and network "B" symbol 608 are constructed utilizing L=I/4. Single OFDM symbol structures as shown in FIGS. 5A and 5B utilize less OFDM symbols but require finer timing. While dual symbol structures as shown in FIGS. 6A and 6B utilize more OFDM symbols but require less accurate timing, and the required accuracy decreases as L decreases since the repeated number of periods increases. In a general sense, the pilots are scalable. This can be accomplished by increasing the alternating interval in a single symbol-based system. Thus, the interval can be every other one or every other two or every other three, etc. The number of pilots should be divisible into the total number of frequency interlaces to afford a periodic signal that can be easily intercepted at frequent time intervals.

Figure 7:
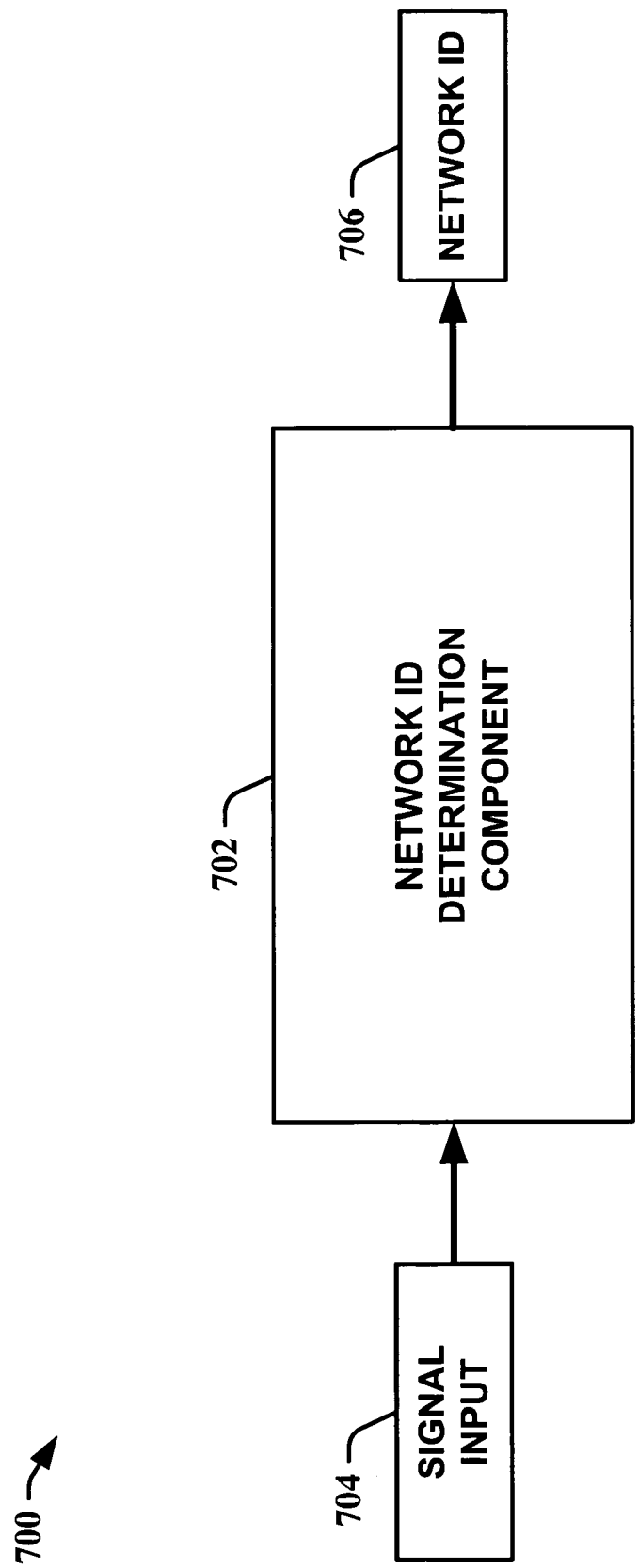
FIG. 7 is a block diagram of a network ID decoding component in accordance with an embodiment.

Once network ID information has been encoded into an OFDM structure, it can be transmitted to a wireless device. The wireless device then decodes the symbol structure to determine the network ID(s). Turning to FIG. 7, a block diagram of a network ID decoding component 700 in accordance with an embodiment is depicted. The network ID decoding component 700 is comprised of a network ID determination component 702. The component 702 receives a signal input 704 and determines a network ID 706 from the signal input 704. The embodiments typically utilize a two step process to make the network ID determination. Additionally, the processes themselves are based upon whether the symbol structure employed is a single symbol structure or a multiple symbol structure.

Figure 8:
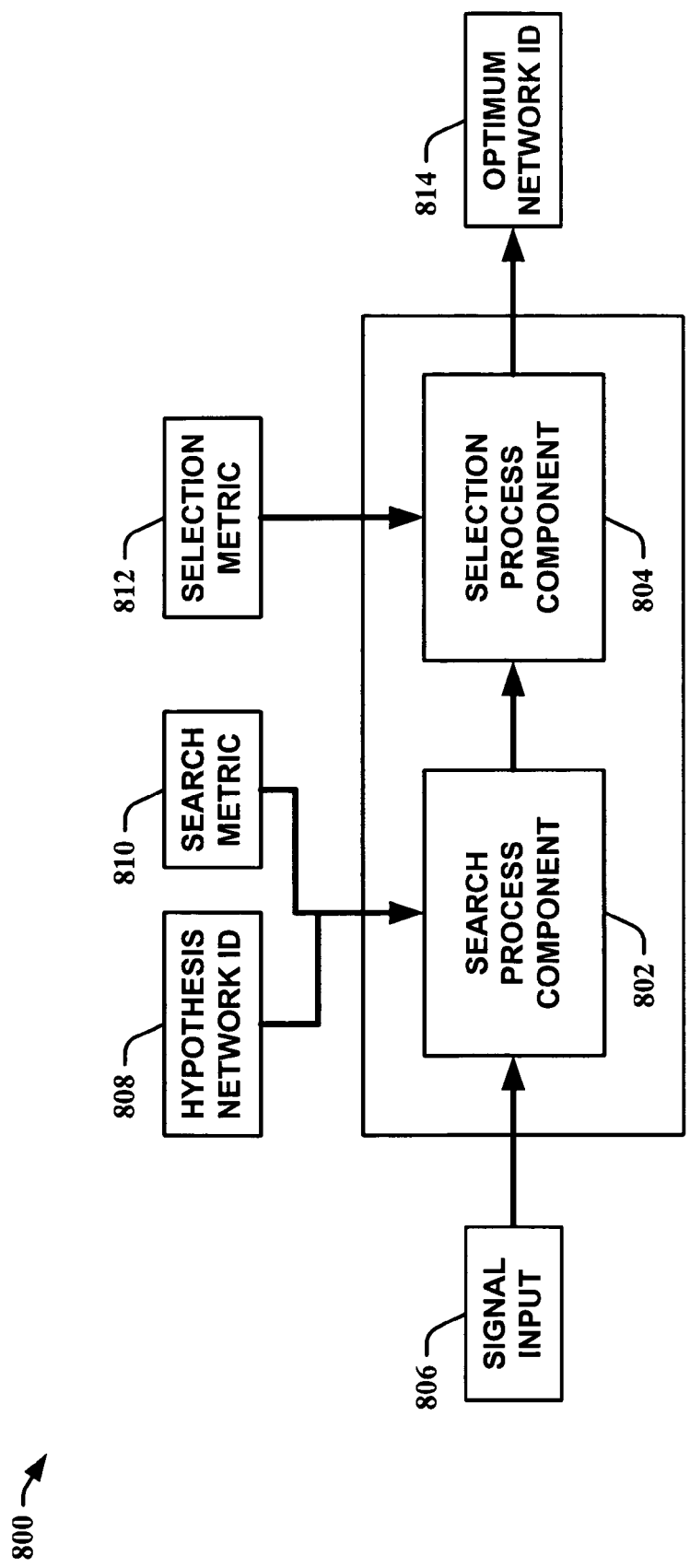
FIG. 8 is a block diagram of a network ID determination component in accordance with an embodiment.

In FIG. 8, a block diagram of a network ID determination component 800 in accordance with an embodiment is illustrated. The network ID determination component 800 is comprised of a search process component 802 and a selection process component 804. The search process component 802 receives a signal input 806 that contains a network ID encoded within an OFDM symbol structure. The search process component 802 employs a hypothesis network ID 808 and a search metric 810 to facilitate in determining a network ID list of possible candidates. The hypothesis network ID 808 originates from a group of possible network IDs. The search metric 810 is described in detail herein and establishes a 'score' for a particular network ID candidate. The selection process component 804 receives the network ID candidate list and employs a selection metric 812 to facilitate in determining an optimum network ID 814. In some embodiments, the selection process component 804 can be omitted.

The acquisition embodiment is utilized to receive the symbol structure 502, 504 in FIGS. 5A and 5B and/or 602, 604 and 606, 608 depicted in FIGS. 6A and 6B. After timing is established, network "A" ID symbol is sampled one or multiple periods depending on the timing accuracy and transformed into the frequency domain. The "$L_A$" number of network "A" ID pilot interlaces are descrambled utilizing one of the hypothesis network "A" IDs and IFFT (Inverse direct Fast Fourier Transform) transformed to obtain an L*512-tap time-domain channel observation. The network "A" ID search metric is calculated and added to a candidate set, $A_M$, of size M, if it makes it to the top M. This process continues until all of the network "A" ID hypotheses are tested.

The network "B" ID symbol is then sampled one or multiple periods. The $L_B$ interlaces are descrambled utilizing one of the hypothesis network "B" IDs combined with a network "A" ID in the network "A" candidate set, $A_M$. The network "B" search metric is then calculated and added to the network "B" candidate set, $B_N$, of size N, if it makes it to the top N. This process continues until all the network "A" IDs in the network "A" candidate set are combined with all the network "B" ID hypotheses and tested.

After the network "A" ID/network "B" ID candidate search process finishes, a selection process begins. The selection process is additionally beneficial in terms of time diversity since the search data is from a fraction of one OFDM symbol. Increased time diversity facilitates to make a better selection from a candidate set. The selection metric is calculated for all the candidates from the next network ID symbols. The selection metric, a combination of search metrics from different network ID symbols, therefore, provides more time diversity than the search metric does. The network "A" ID with the best selection metric is selected as the optimum network ID candidate. The network "B" ID is selected from network "A"/ network "B" ID combinations that yield the best selection metric score. The design of the selection metric is discussed herein. In one embodiment, the selection process can be avoided by setting M=N=1.

An optimum network "A"/network "B" ID combination is the one with the largest combined search metric:

$$(NETA, NETB)^* = \max_{NETA \subseteq A_M, NETB \subseteq B_N} \left\{ \sum_{s=1}^{S} \eta_{NETA}(s) + \eta_{NETA,NETB}(s) \right\}. \quad \text{(Eq. 1)}$$

where S is the number of time diversity combinations from the selection process.

Figure 9:
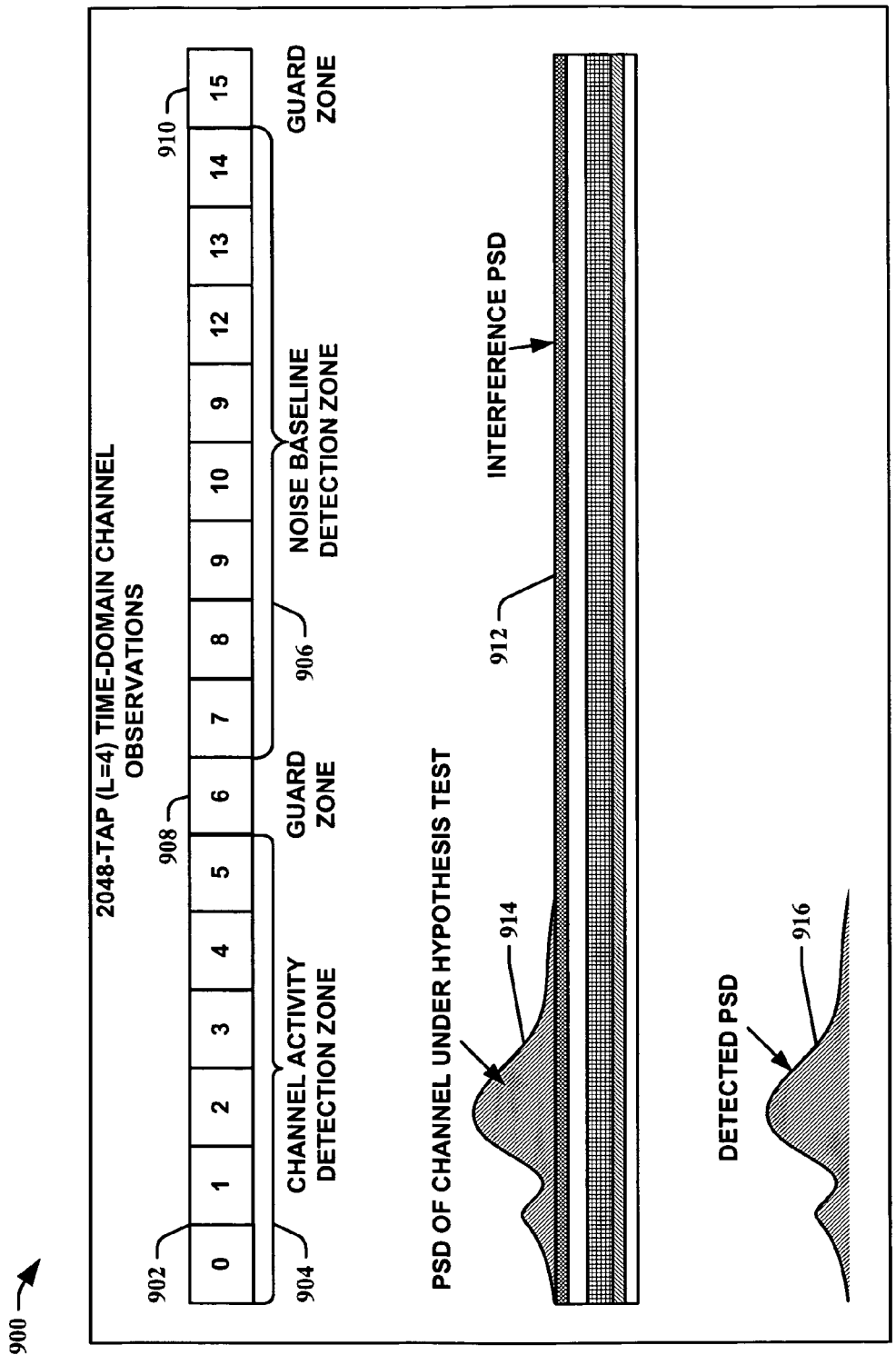
FIG. 9 is an illustration of a search metric calculation in accordance with an embodiment.

In FIG. 9, an illustration 900 of a search metric calculation in accordance with an embodiment is shown. When pilot samples are much longer than a maximum channel, e.g., L=4, the network "A"/network "B" search metric is calculated utilizing the following procedure. 512L tap network "A"/ network "B" time-domain channel observations are divided, for example, into 16 bins 902, each of which is 128 taps long. Bins 0-5 904 are utilized for channel activity detection (assuming, for example, that a channel spread is less than 768 taps). Bins 7-14 906 are utilized for noise baseline/interference power spectral density (PSD) calculations since no channel activity should exist in this zone. To allow possible channel energy leakage from the channel activity zone 904 into noise baseline detection zone 906 due to miss-time alignment, Bin 6 908 and Bin 15 910 are not utilized for the interference PSD calculation.

The search metric for the nth TDM pilot network "A"/ network "B" symbol is defined as follows for the detected PSD energy, η 916:

$$\eta^{(i)}(n) = \sum_{k=0}^{5\cdot 128-1} (\max\{s_k^{(i)}(n) - \lambda w^{(i)}(n), 0\}); \quad \text{(Eq. 2)}$$

where:

$$w^{(i)}(n) = \frac{1}{8 \cdot 128} \sum_{k=7 \cdot 128}^{14 \cdot 128-1} s_k^{(i)};$$

is the interference PSD energy 912, $s_k^{(i)}$ is the energy 914 of the kth sample under the ith hypothesis and λ is a predetermined constant. The search metric is an unbiased estimate of the total energy of the channel under the hypothesis.

The final search metric with S selection diversity is:

$$\eta^{(i)} = \sum_{s=1}^{S} \eta^{(i)}(s);$$

which is the sum of the search metric obtained from both network "A"/network "B" ID symbols to gain time-diversity as well as reduce estimation variance. This search metric does not assume any channel profile and, therefore, is channel profile safe.

In the case of a mismatch between a hypothesis ID and a correct ID, the channel energy of the correct ID broadcast will be evenly spread over the whole 16 bins, and no significant channel energy should be detected in the activity zone utilizing the search metric, i.e., η→0. However, if the hypothesis ID matches the correct ID, the broadcast channel with the correct ID will be dispread, and the channel energy will be confined within the activity zone. For channels who's ID does not match a hypothesis ID, the channel energy will be spread over the whole 16 bins. In this case, significant energy will be detected utilizing the search metric, i.e., η→0.

However, in the case where the pilot samples are not longer than a maximum channel, such as I=1 in FIG. 6, a separation between the channel under hypothesis and interference does not exist. The channel activity zone and the noise zone overlaps. Therefore, the interference PSD, w, in (Eq. 2) is a biased estimate (over-estimate) of the interference PSD. In the extreme case when L=1 and the channel is longer than 512, the interference PSD estimate becomes:

$$w = \frac{1}{4 \cdot 128} \sum_{j=0}^{4 \cdot 128-1} s_j; \quad \text{(Eq. 4)}$$

which is always an over-estimate of the interference power spectral density. The search metric defined in (Eq. 2) then becomes:

$$\tilde{\eta}^{(i)} = \sum_{k=0}^{4 \cdot 128-1} \max\{(s_k^{(i)} - \lambda w), 0\}; \quad \text{(Eq. 5)}$$

resulting in a biased estimate (under-estimate) of the energy of the channel under hypothesis. The flatter the channel time response, the greater the bias. In other words, unlike the search metric in (Eq. 2) which is profile independent, the search metric in (Eq. 5) favors the channel with a concentrated profile, although an OFDM receiver in general does not have this discrimination.

In view of the exemplary systems shown and described above, methodologies that may be implemented in accordance with the embodiments will be better appreciated with reference to the flow charts of FIGS. 10-14. While, for purposes of simplicity of explanation, the methodologies are shown and described as a series of blocks, it is to be understood and appreciated that the embodiments are not limited by the order of the blocks, as some blocks may, in accordance with the embodiments, occur in different orders and/or concurrently with other blocks from that shown and described herein. Moreover, not all illustrated blocks may be required to implement the methodologies in accordance with the embodiments.

Figure 10:
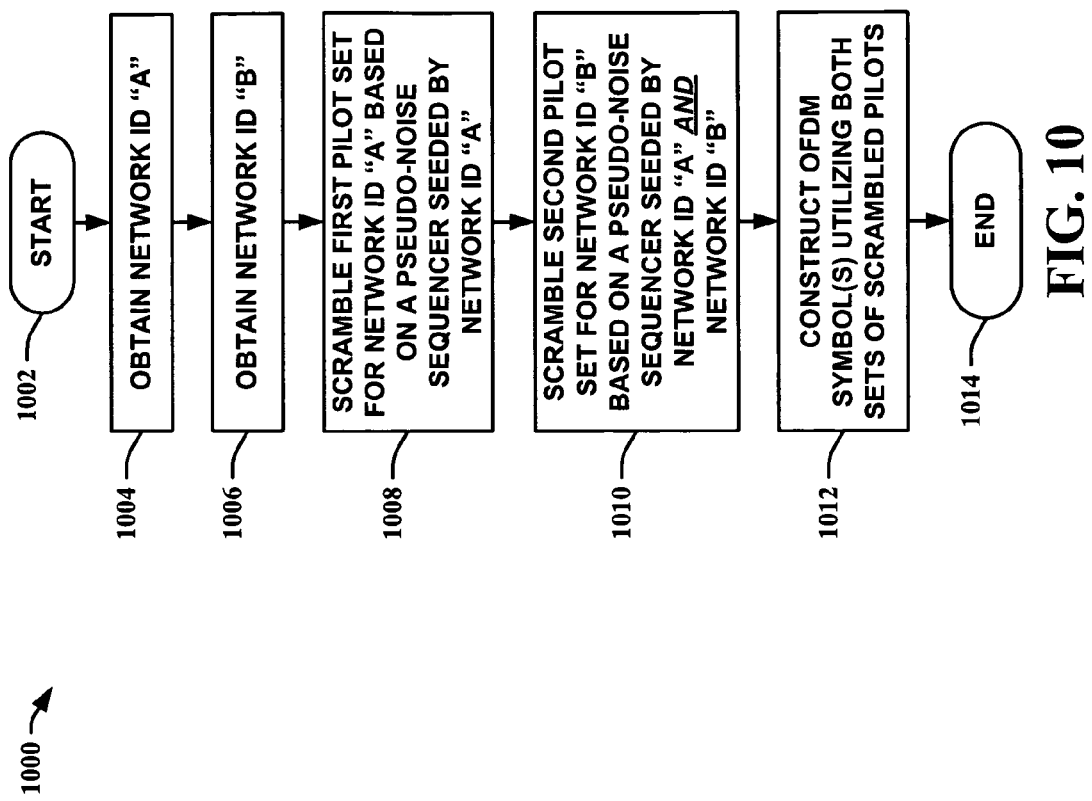
FIG. 10 is a flow diagram of a method of constructing an OFDM symbol based on scrambled pilots generated from network IDs in accordance with an embodiment.

In FIG. 10, a flow diagram of a method 1000 of constructing an OFDM symbol based on scrambled pilots generated from network IDs in accordance with an embodiment is shown. The method 1000 starts 1002 by obtaining a network ID for network "A" 1004 and network "B" 1006. These networks can be a wide area network and a local area network and the like. Typically, utilization of the local area network programming requires both the local area ID and the wide area ID. A first set of pilots are then scrambled with a pseudo-noise sequencer seeded by network "A" ID 1008. This encodes the network ID into the pilots. A second set of pilots are then also scrambled with a pseudo-noise sequencer seeded by both network "A" ID and network "B" ID 1010. This encodes the network "B" ID into the scrambled pilots, but also requires that network "A" ID be known to facilitate in decoding the network IDs. OFDM symbol(s) are then constructed utilizing both sets of scrambled pilots 1012, ending the flow 1014. The pilot sets can be interleaved in a single OFDM symbol and/or one OFDM symbol can be employed for each set of pilots. Utilizing a single OFDM symbol requires higher accuracy in timing for acquisition than with multiple symbols.

Figure 11:
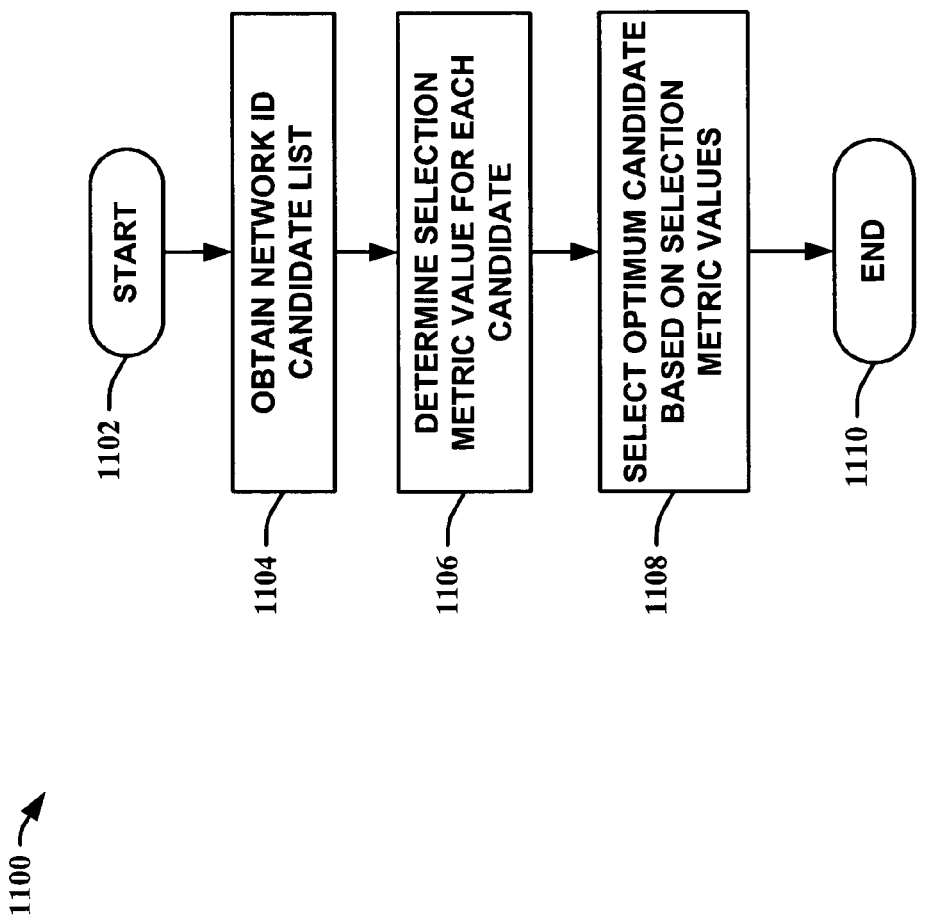
FIG. 11 is a flow diagram of a method of selecting network ID candidates in accordance with an embodiment.

Turning to FIG. 11, a flow diagram of a method 1100 of selecting network ID candidates in accordance with an embodiment s illustrated. This method 1100 of selecting an optimum network ID candidate is typically employed with transmission of network IDs utilizing a single OFDM symbol. The method 1100 starts 1102 by obtaining a network ID candidate list 1104. The network ID candidate list is typically constructed as described herein. A selection metric value or score is then determined for each candidate 1106. The selection metric is calculated for all candidates from the pilot symbols at the boundaries of frames of the superframe. It provides more time diversity than the search metric. An optimum candidate is then selected based on the selection metric values/scores 1108, ending the flow 1110.

Figure 12:
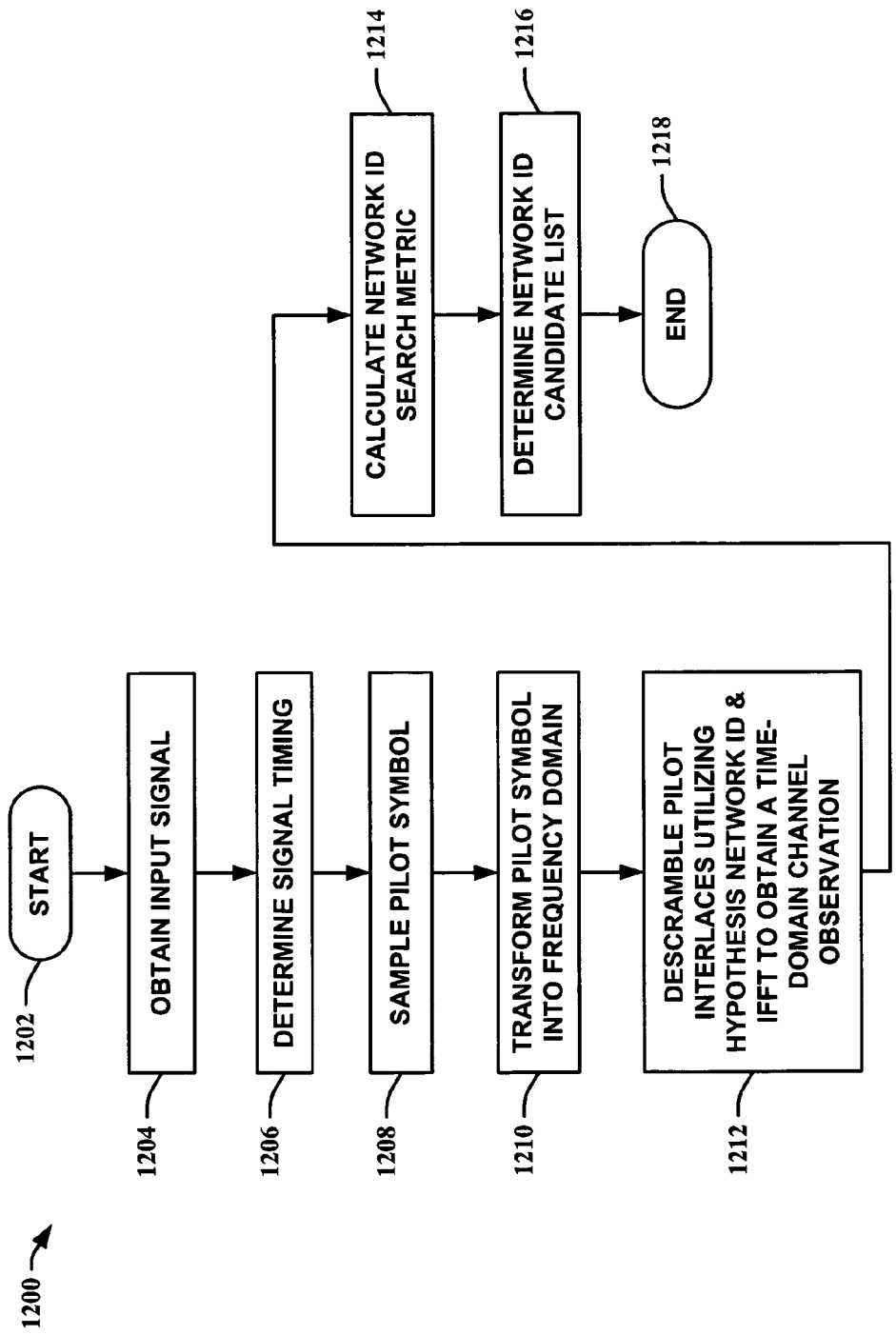
FIG. 12 is another flow diagram of a method of searching for network ID candidates in accordance with an embodiment.

Looking at FIG. 12, another flow diagram of a method 1200 of searching for network ID candidates in accordance with an embodiment is shown. This method 1200 is generally applicable to network IDs transmitted utilizing a multiple OFDM symbols. The method 1200 starts 1202 by acquiring an input signal 1204 and establishing the SFN timing 1206. A network ID pilot is then sampled 1208 and transformed into the frequency domain 1210. A hypothesis network ID is utilized to facilitate in descrambling the pilot interlaces which are then employed to obtain a time-domain channel observation 1212. A network ID search metric is then calculated 1214 and utilized to construct a network ID candidate list 1216, ending the flow 1218.

Figure 13:
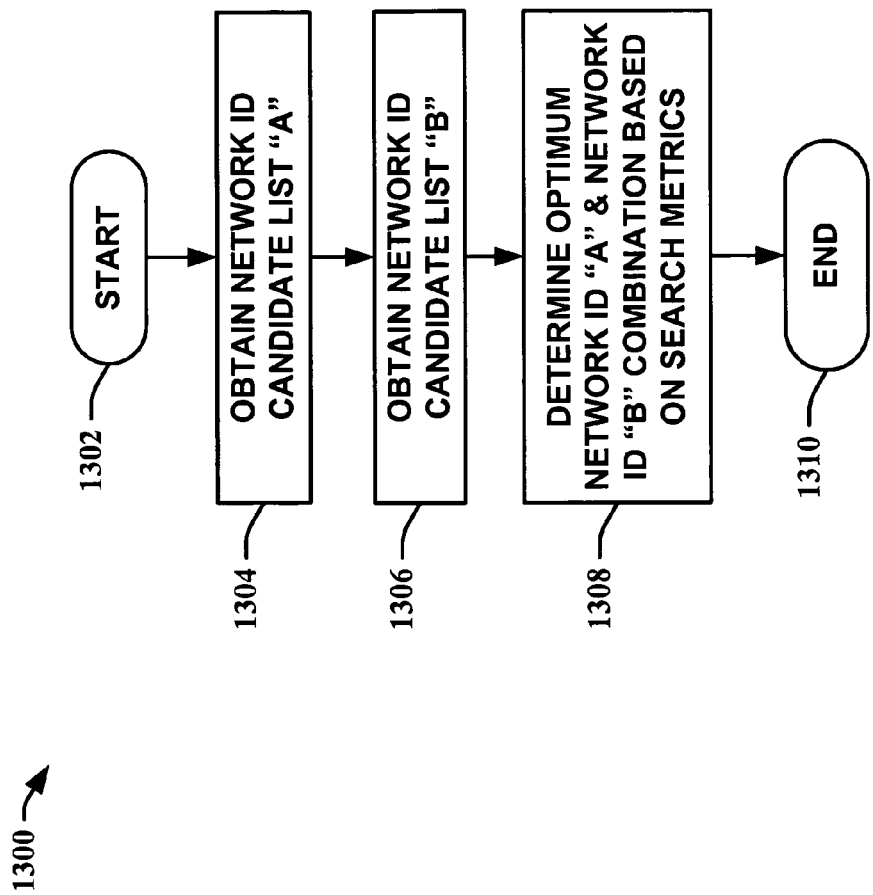
FIG. 13 is another flow diagram of a method of selecting network ID candidates in accordance with an embodiment.

Moving on to FIG. 13, another flow diagram of a method 1300 of selecting network ID candidates in accordance with an embodiment is depicted. This method 1300 selects an optimum combination of network IDs and can be applicable to either single OFDM symbol construction and/or multiple symbol construction network ID transmission acquisitions. The method 1300 starts 1302 by obtaining a network ID candidate list for network "A" 1304 and a network ID candidate list for network "B" 1306. The candidate list can be obtained according to the flow in FIG. 12. An optimum combination of network ID "A" and network ID "B" is then determined based on search metric scores 1308, ending the flow 1310. When determining an optimum second network ID from a candidate list, the second network ID is selected from the highest scoring combination of the first and second network IDs after the first optimum network ID has been determined.

Figure 14:
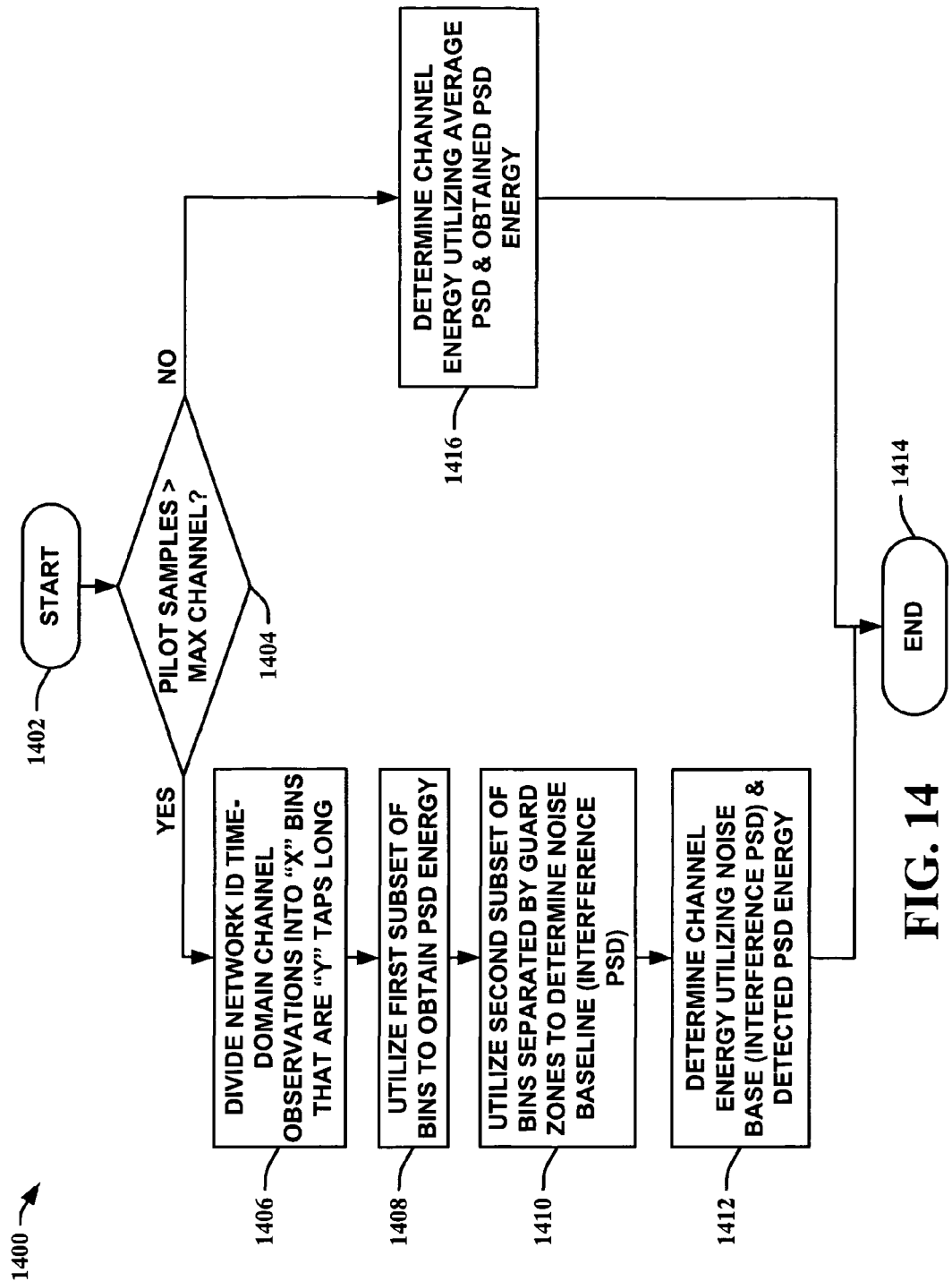
FIG. 14 is a flow diagram of a method of determining a search metric in accordance with an embodiment.

In FIG. 14, a flow diagram of a method 1400 of determining a search metric in accordance with an embodiment is shown. The search metric can be applicable to both single and multiple OFDM symbol network ID transmissions. The method 1400 starts 1402 by determining if pilot samples are longer than a maximum channel 1404. If yes, network ID time-domain channel observations are divided into "X" bins that are "Y" taps long, where X and Y are integers from one to infinity 1406. A first subset of the bins is utilized for detecting channel energy in the form of power spectral density (PSD) energy 1408. A second subset of bins separated by guard zones is utilized to determine a noise baseline or interference PSD energy 1410. Channel energy (detected PSD) is then determined by eliminating the interference PDS energy from the obtained PSD energy 1412, ending the flow 1414. When a mismatch occurs between a hypothesis network ID and a correct network ID, the channel energy of the correct network ID is broadcast evenly over all of the bins and, therefore, no significant amount of energy is detected in the first subset of bins. However, if a match occurs, the broadcast channel with the correct network ID is dispread, and the channel energy is confined within the first subset of bins. This form of the search metric provides an unbiased estimate of the total energy of the channel under hypothesis. Examples of this process are described herein and are illustrated in FIG. 9.

If, however, the pilot samples are not longer than the maximum channel 1404, the channel energy is determined by eliminating an average PSD energy from the obtained PSD energy 1416, ending the flow 1414. The average PSD energy is utilized in this instance because no separation between the channel under hypothesis and the interference PSD exists. Utilizing the average PSD energy generally produces an overestimate of the interference PSD resulting in a biased estimate of the channel under hypothesis.

Figure 15:
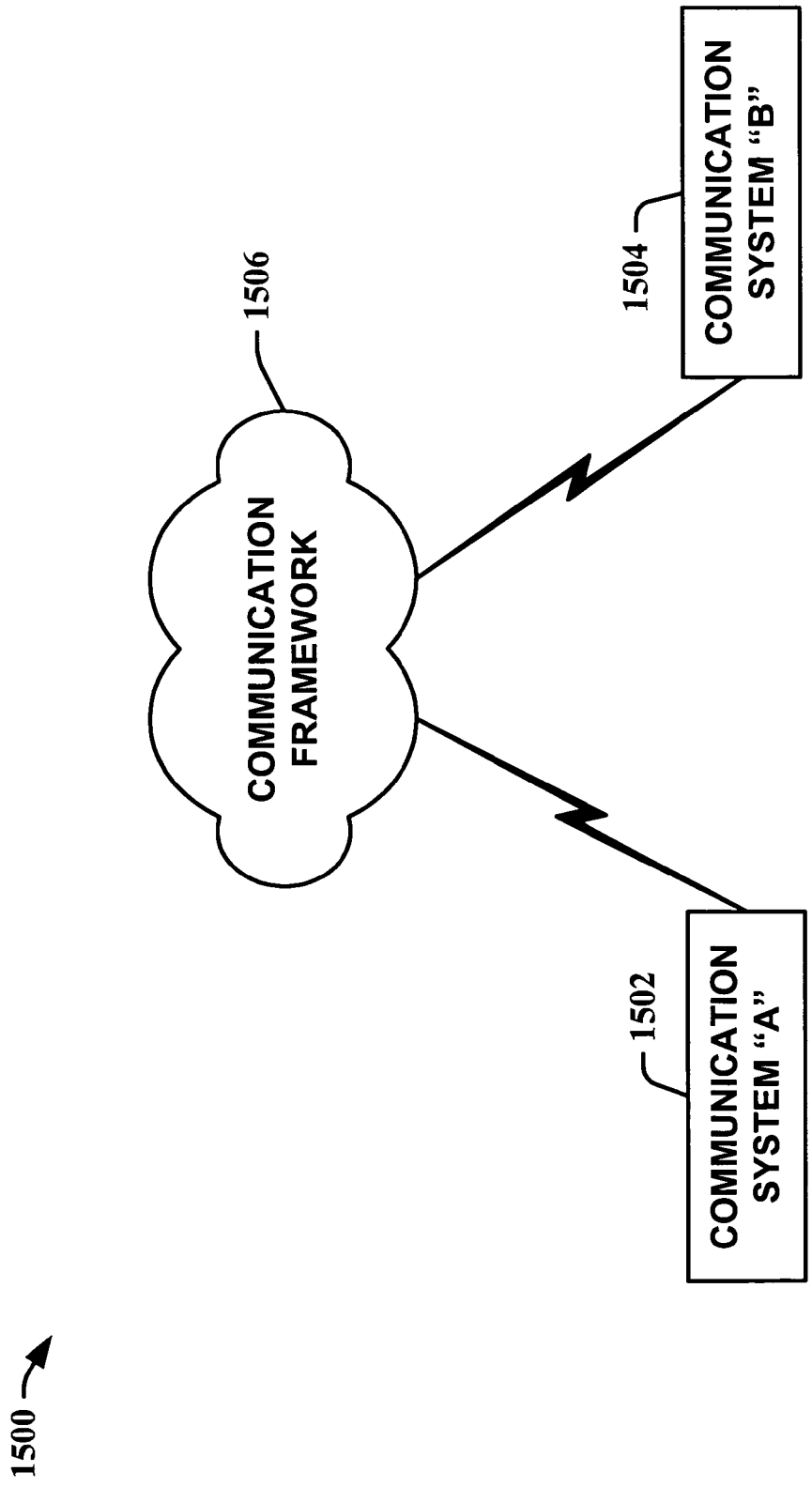
FIG. 15 illustrates an example communication system environment in which the embodiments can function.

FIG. 15 is a block diagram of a sample communication system environment 1500 with which the embodiments can interact. The system 1500 further illustrates two representative communication systems A 1502 and B 1504. One possible communication between systems A 1502 and B 1504 may be in the form of a data packet adapted to be transmitted between two or more communication systems. The system 1500 includes a communication framework 1506 that can be employed to facilitate communications between the communication system A 1502 and communication system B 1504.

In one embodiment, a data packet transmitted between two or more communication system components that facilitates data communications is comprised of, at least in part, information relating to a network ID that is communicated with at least one OFDM symbol structure that employs at least one pilot respective of the network ID.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for facilitating wireless communications that enables a receiving entity to know the origination of a transmission symbol, comprising:
   utilizing at least one OFDM symbol structured with at least one pilot encoded with a network ID for communicating the network ID between entities;
   employing, by the receiving entity, a search process to determine network ID candidates based on a search metric;
   employing a selection process to determine at least one optimum network ID candidate based on a selection metric; and
   wherein the search process utilizes a hypothesis network ID to facilitate in the search process, and the search metric comprises a metric of an unbiased estimate of total energy of a channel.

2. The method of claim 1 further comprising:
   employing an OFDM symbol structure with one respective network ID pilot per symbol.

3. The method of claim 1 further comprising:
   employing an OFDM symbol structure with respective network ID pilots interleaved in at least one symbol.

4. The method of claim 1, wherein the receiving entity comprises at least one of a network or a mobile device.

5. The method of claim 1 further comprising:
   employing a pseudo-noise (PN) sequence generator, seeded by at least one network ID, to facilitate in scrambling the network ID pilot.

6. The method of claim 1, the selection process comprising:
   determining the selection metric for at least one candidate network ID; and
   determining an optimum candidate network ID from at least one candidate network ID list based on the selection metric.

7. The method of claim 6 further comprising:
   determining an optimum combination of a plurality of network ID candidates from the candidate network ID lists to facilitate in determining a plurality of network IDs.

8. The method of claim 1, wherein the network ID comprises at least one of a wide area network ID or a local area network ID.

9. The method of claim 8 further comprising:
   employing an OFDM symbol with a local area network ID pilot scrambled utilizing both the local area network ID and the wide area network ID.

10. The method of claim 1, wherein the search process utilizes a first portion of a channel to detect overall channel energy and a second portion of the channel to detect interference power spectral density (PSD) energy of the channel, and a difference of the overall channel energy and the interference PSD energy yielding a search metric score.

11. The method of claim 1, wherein the search process utilizes an overall channel energy of a channel and an average power spectral density (PSD) energy of the channel, and a difference of the overall channel energy and the average PSD energy yielding a search metric score.

12. A method for facilitating data communications between receiving and transmitting entities, comprising:
   utilizing at least one OFDM symbol structured with at least one pilot respective of a network ID for communicating the network ID between entities;
   determining a network ID from the respective ID pilot in the OFDM symbol;
   employing, by the receiving entity, a search process to determine network ID candidates based on a search metric; and
   employing a selection process to determine at least one optimum network ID candidate based on the selection metric; the search process utilizing a hypothesis network ID to facilitate in the search process, and the search metric comprising a metric of an unbiased estimate of total energy, η, of a channel based on:

$$\eta^{(i)}(n) = \sum_{k=0}^{5 \cdot 128 - 1} (\max\{s_k^{(i)}(n) - \lambda w^{(i)}(n), 0\}); \quad \text{(Eq. 2)}$$

where n is the nth pilot symbol, $$w^{(i)}(n) = \frac{1}{8 \cdot 128} \sum_{k=7 \cdot 128}^{14 \cdot 128 - 1} s_k^{(i)}$$

is an interference power spectral density (PSD) energy, and $s_k^{(i)}$ is an energy of a kth sample under an ith hypothesis, and λ is a predetermined constant.

13. The method of claim 12, the search metric for an interleaved network ID pilot symbol comprising:

$$\eta^{(i)} = \sum_{s=1}^{S} \eta^{(i)}(s).$$

14. A method for facilitating wireless communications that enables a receiving entity to know the origination of a transmission symbol, comprising:
   utilizing at least one OFDM symbol structured with at least one pilot encoded with a network ID for communicating the network ID between entities;
   employing, by the receiving entity, a search process to determine network ID candidates based on a search metric;
   employing a selection process to determine at least one optimum network ID candidate based on a selection metric; and
   wherein the search process further comprises:
      determining a candidate network ID through employment of at least one hypothesis network ID in the search process;
      determining at least one candidate network ID list;
      determining at least one network ID candidate set from the candidate list according to the search metric; and
      determining a first top candidate list for a first network ID type or a second top candidate list for a second network ID type.

15. A method for facilitating data communications between receiving and transmitting entities, comprising:
   utilizing at least one OFDM symbol structured with at least one pilot respective of a network ID for communicating the network ID between entities;
   determining a network ID from the respective ID pilot in the OFDM symbol;
   employing, by the receiving entity, a search process to determine network ID candidates based on a search metric;

employing a selection process to determine network ID candidates based on a search metric;
employing a selection process to determine at least one optimum network ID candidate based on the selection metric;
determining the selection metric for at least one candidate network ID;
determining an optimum candidate network ID from at least one candidate network ID list based on the selection metric; and
determining an optimum combination of a plurality of network ID candidates from the candidates from the candidate network ID lists to facilitate in determining a plurality of network IDs;
wherein the optimum combination comprising a maximized value of search metrics based on:

$$(NETA, NETB)^* = \max_{NETA \subseteq A_M, NETB \subseteq B_N} \left\{ \sum_{s=1}^{S} \eta_{NETA}(s) + \eta_{NETA,NETB}(s) \right\}; \quad \text{(Eq. 1)}$$

where NETA represents a first network ID, NETB represents a second network ID, $A_M$ is a first network ID candidate set of size M, $B_N$ is a second network ID candidate set of size N, $\eta$ is a value of a search metric for an nth candidate, and S is a number of time diversity combinations from a selection process.

16. A system that facilitates data communications that enables the receiving entity to know the origination of a transmission symbol, comprising:
a communication component that communicates at least one network ID between entities by utilizing at least one OFDM symbol that includes at least one pilot respective of the network ID;
a search component configured to employ a search process to determine network ID candidates based on a search metric;
a selection component configured to employ a selection process to determine at least one optimum network ID candidate based on a selection metric;
wherein the communication component is configured to employ one OFDM symbol for each respective network ID pilot; and
wherein the search process utilizes a hypothesis network ID to facilitate in the search process, and the search metric comprises a metric of an unbiased estimate of total energy of a channel.

17. The system of claim 16,
wherein the communication component is configured to interleave respective network ID pilots in at least one OFDM symbol.

18. The system of claim 17, wherein the receiving entity comprises at least one of a network or a mobile device.

19. The system of claim 18, further comprising:
a pseudo-noise (PN) sequence generator configured to employ the communication component, seeded by at least one network ID, to facilitate in scrambling the pilot.

20. The system of claim 16, wherein the network ID comprises at least one of a wide area network ID or a local area network ID.

21. The system of claim 20, wherein a pilot for the local area network ID is scrambled utilizing both the local area network ID and the wide area network ID.

22. A system for facilitating wireless data communications that enables the receiving entity to know the origination of a transmission symbol, comprising:
a communication component that utilizes at least one OFDM symbol structured with at least one pilot encoded with a network ID for communicating the network ID between entities;
a component configured to employ a search process to determine network ID candidates based on a search metric;
a component configured to employ a selection process to determine at least one optimum network ID candidate based on a selection metric;
a network ID determination component employed by the communication component that determines network IDs from at least one OFDM symbol;
wherein the search component is configured to employ a hypothesis network ID and a search metric to create a candidate list of possible network IDs;
wherein the search metric comprises a metric that utilizes channel energy to facilitate in determining a possible network ID;
wherein the search component is configured to utilize a first portion of a channel to detect overall channel energy and a second portion of the channel to detect interference power spectral density (PSD) energy of the channel; and
a difference of the overall channel energy and the interference PSD energy yielding a search metric score.

23. A system for facilitating wireless data communications that enables the receiving entity to know the origination of a transmission symbol, comprising:
a communication component that utilizes at least one OFDM symbol structured with at least one pilot encoded with a network ID for communicating the network ID between entities;
a component configured to employ a search process to determine network ID candidates based on a search metric;
a component configured to employ a selection process to determine at least one optimum network ID candidate based on a selection metric;
a network ID determination component employed by the communication component that determines network IDs from at least one OFDM symbol;
wherein the search component is configured to employ a hypothesis network ID and a search metric to create a candidate list of possible network IDs;
wherein the search metric comprises a metric that utilizes channel energy to facilitate in determining a possible network ID;
wherein the search component is configured to utilize an overall channel energy of a channel and an average power spectral density (PSD) energy of the channel; and
a difference of the overall channel energy and the average PSD energy yielding a search metric score.

24. The system of claim 23, wherein the selection component is configured to employ a selection metric to determine an optimum network ID candidate from the candidate list.

25. The system of claim 23, wherein the selection component utilizes a search metric valuation of a plurality of network ID candidate lists representative of different networks to determine an optimum combination of network ID candidates.

26. An OFDM-based communication system that employs the system of claim 16 to transmit or receive network identification information.

27. A system that facilitates wireless data communications that enables the receiving entity to know the origination of a transmission symbol, comprising:
- means for utilizing at least one OFDM symbol structured with at least one pilot encoded with a network ID for communicating the network ID between entities;
- means to employ a search process to determine network ID candidates based on a search metric;
- means to employ a selection process to determine at least one optimum network ID candidate based on a selection metric;
- means for employing one OFDM symbol for each respective network ID pilot; and
- wherein the search process utilizes a hypothesis network ID to facilitate in the search process, and the search metric comprises a metric of an unbiased estimate of total energy of a channel.

28. The system of claim 27, further comprising:
- means for interleaving respective network ID pilots into at least one OFDM symbol.

29. The system of claim 28, wherein the receiving entity comprises at least one of a network or a mobile device.

30. The system of claim 29, further comprising:
- means for employing a pseudo-noise (PN) sequence generator, seeded by at least one network ID, to facilitate in scrambling the pilot.

31. The system of claim 27, further comprising:
- means for determining network IDs from at least one OFDM symbol.

32. The system of claim 31, further comprising:
- means for employing a hypothesis network ID and a search metric to create a candidate list of possible network IDs.

33. The system of claim 32, further comprising:
- means for utilizing channel energy to facilitate in determining a possible network ID.

34. The system of claim 32, further comprising:
- means for employing a selection metric to determine an optimum network ID candidate from the candidate list.

35. The system of claim 32, further comprising:
- means for utilizing a search metric valuation of a plurality of network ID candidate lists representative of different networks to determine an optimum combination of network ID candidates.

36. The system of claim 27, wherein the network ID comprises at least one of a wide area network ID or a local area network ID.

37. The system of claim 36, further comprising:
- means for scrambling a pilot for the local area network ID utilizing both the local area network ID and the wide area network ID.

38. A system that facilitates data communications, comprising:
- means for communicating an OFDM symbol between entities;
- means for determining network IDs from at least one OFDM symbol;
- means for employing a search process and a selection process to facilitate in determining a network ID;
- means for employing a hypothesis network ID and a search metric to create a candidate list of possible IDs;
- means for utilizing channel energy to facilitate in determining a possible network ID and wherein the means for employing the search process includes means for utilizing a first portion of a channel to detect overall channel energy and a second portion of the channel to detect interference power spectral density (PSD) energy of the channel; and
- a difference of the overall channel energy and the interference PSD energy yielding a search metric score.

39. A system that facilitates data communications, comprising:
- means for communicating an OFDM symbol between entities;
- means for utilizing at least one OFDM symbol that includes at least one pilot respective of the network ID communicated between the entities;
- means for determining network IDs from at least one OFDM symbol;
- means for employing a search process and a selection process to facilitate in determining a network ID;
- means for employing a hypothesis network ID and a search metric to create a candidate list of possible network IDs;
- means for utilizing channel energy to facilitate in determining a possible network ID;
- wherein the means for employing the search process includes means for utilizing an overall channel energy of a channel and an average power spectral density (PSD) energy of the channel; and
- a difference of the overall channel energy and the average PSD energy yielding a search metric score.

40. A computer program product, embedded in a non-transitory computer readable storage medium, for performing a method of facilitating data communications that enables the receiving entity to know the origination of a transmission symbol, comprising:
- a first set of codes for causing a computer to utilize at least one OFDM symbol structured with at least one pilot encoded with a network ID for communicating the network ID between entities;
- a second set of codes for causing the computer to employ a search process to determine network ID candidates based on a search metric;
- a third set of codes for causing the computer to employ a selection process to determine at least one optimum network ID candidate based on a selection metric; and
- wherein the search process utilizes a hypothesis network ID to facilitate in the search process, and the search metric comprises a metric of an unbiased estimate of total energy of a channel.

41. The computer program product of claim 40, wherein the first set of codes is further for utilizing an OFDM symbol structure with one respective network ID pilot per symbol.

42. The computer program product of claim 40, wherein the first set of codes is further for utilizing an OFDM symbol structure with respective network ID pilots interleaved in at least one symbol.

43. The computer program product of claim 40, wherein the receiving entity comprises at least one of a network or a mobile device.

44. The computer program product of claim 40, further comprising a fourth set of codes to construct an OFDM symbol through utilization of a network ID to facilitate in scrambling a network ID pilot utilized in the OFDM symbol.

45. The computer program product of claim 40, further comprising a fourth set of codes for employing a pseudo-noise (PN) sequence generator, seeded by at least one network ID, to facilitate in scrambling the at least one pilot with the network ID.

46. The computer program product of claim 40, wherein the search process utilizes a first portion of a channel to detect overall channel energy and a second portion of the channel to detect interference power spectral density (PSD) energy of the channel, and a difference of the overall channel energy and the interference PSD energy yielding a search metric score.

47. The computer program product of claim 40, wherein the search process utilizes an overall channel energy of a channel and an average power spectral density (PSD) energy of the channel, and a difference of the overall channel energy and the average PSD energy yielding a search metric score.

* * * * *